(12) United States Patent
Lim

(10) Patent No.: US 7,391,831 B2
(45) Date of Patent: Jun. 24, 2008

(54) APPARATUS AND METHOD FOR MODE TRANSITION OF A TRANSMIT DIVERSITY SCHEME IN A MOBILE COMMUNICATION SYSTEM FOR USING TRANSMIT DIVERSITY SCHEME IN A MOBILE COMMUNICATION SYSTEM FOR USING TRANSMIT

(75) Inventor: Young-Seok Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 665 days.

(21) Appl. No.: 10/846,933

(22) Filed: May 17, 2004

(65) Prior Publication Data

US 2005/0084029 A1    Apr. 21, 2005

(30) Foreign Application Priority Data

May 16, 2003    (KR) .................... 10-2003-0031334

(51) Int. Cl.
 *H04B 7/10* (2006.01)
(52) U.S. Cl. .................. 375/347; 375/316; 375/346; 375/353; 455/132; 455/296
(58) Field of Classification Search .............. 375/299, 375/267
 See application file for complete search history.

(56) References Cited

U.S. PATENT DOCUMENTS 6,584,161 B2 *   6/2003   Hottinen et al. ............. 375/299

(Continued)

FOREIGN PATENT DOCUMENTS

JP    2002-232334    8/2002

(Continued)

OTHER PUBLICATIONS

Seeger, A. Sikora, M., Antenna Weigh Verification for Closed Loop Transmit Diversity, Dec. 1-5, 2003, Global Telecommunications Conference, 2003. Globecom '03. IEEE, vol. 2, On pp. 1124-1129 vol. 2☐☐.*

(Continued)

*Primary Examiner*—Shuwang Liu
*Assistant Examiner*—Kenneth Lam
(74) *Attorney, Agent, or Firm*—Roylance, Abrams, Berdo & Goodman, LLP

(57) ABSTRACT

An apparatus and method for Transmit Diversity mode transition in a mobile communication system for use with transmit diversity is disclosed. In a mobile communication system including a Node B comprising one or more antennas and a Mobile Station (MS) for transmitting Transmit Diversity information to the Node B to enable the plurality of antennas to implement the maximum Transmit Diversity. The apparatus and method for assigning weights to transmission data of the antennas to enable the Node B to implement the maximum Transmit Diversity when the mode transition occurs in the Transmit Diversity modes comprise determining whether the mode transition occurs using the Transmit Diversity information; and assigning a weight generated considering the relationship between a current weight and a previous weight used before the mode transition time to the data transmitted over the antennas if it is determined that the mode transition occurs.

16 Claims, 9 Drawing Sheets

U.S. PATENT DOCUMENTS

| | | | | |
|---|---|---|---|---|
| 6,594,473 | B1* | 7/2003 | Dabak et al. | 455/101 |
| 6,798,847 | B2* | 9/2004 | Hwang et al. | 375/299 |
| 6,831,943 | B1* | 12/2004 | Dabak et al. | 375/147 |
| 7,016,657 | B2* | 3/2006 | Boariu | 455/102 |
| 7,020,445 | B1* | 3/2006 | Miya | 455/101 |
| 7,136,627 | B2* | 11/2006 | Hamalainen et al. | 455/101 |
| 7,155,177 | B2* | 12/2006 | Jootar et al. | 455/101 |
| 7,181,167 | B2* | 2/2007 | Onggosanusi et al. | 455/63.1 |
| 7,200,368 | B1* | 4/2007 | Hottinen et al. | 455/101 |
| 7,224,943 | B2* | 5/2007 | Hamalainen et al. | 455/69 |
| 7,266,157 | B2* | 9/2007 | Sim et al. | 375/267 |
| 2002/0044591 | A1* | 4/2002 | Lee et al. | 375/130 |
| 2002/0131381 | A1* | 9/2002 | Kim et al. | 370/335 |
| 2004/0077378 | A1* | 4/2004 | Kim et al. | 455/562.1 |
| 2004/0235526 | A1* | 11/2004 | Kaipainen et al. | 455/561 |

FOREIGN PATENT DOCUMENTS

| | | |
|---|---|---|
| WO | WO-02-093783 | 11/2002 |

OTHER PUBLICATIONS

Hamalainen, J. Wichman, R., Closed-loop transmit diversity for FDD WCDMA systems, 2000, Signals, Systems and Computers, 2000. Conference Record of the Thirty-Fourth Asilomar Conference On, vol. 1, on pp. 111-115 vol. 1.*

Keun Chul Hwang Kwang Bok Lee, Efficient weight vector representation for closed-loop transmit diversity, Jan. 2004, Communications, IEEE Transactions on, vol. 52, Issue: 1 On pp. 9-16☐☐ ☐☐.*

"3rd Generation Partnership Project Technical Specification Group Radio Access Network Physical Layer Procedures", Mar. 2002, pp. 1-56.

Hottinen, Ari and Wichman, Risto, "Transmit Diversity Using Filtered Feedback Weights in the FDD/WCDMA System", Broadband Communications, 2000, 2000 International Zurich Seminar on Zurich, Switzerland, Feb. 15-17, 2000, Piscataway, NJ, USA, pp. 15-21.

Hamalainen, Jyri and Wichman, Risto, "Feedback Schemes for FDD WCDMA Systems in Multipath Environments", VTC 2001 Springe, IEEE VTS 53rd Vehicular Technology Conference, Rhodes, Greece, May 6-9, 2001, pp. 238-242.

* cited by examiner

APPARATUS AND METHOD FOR MODE TRANSITION OF A TRANSMIT DIVERSITY SCHEME IN A MOBILE COMMUNICATION SYSTEM FOR USING TRANSMIT DIVERSITY SCHEME IN A MOBILE COMMUNICATION SYSTEM FOR USING TRANSMIT

PRIORITY

This application claims the benefit under 35 U.S.C. § 119(a) of an application entitled "APPARATUS AND METHOD FOR MODE TRANSITION OF TRANSMIT DIVERSITY SCHEME IN MOBILE COMMUNICATION SYSTEM FOR USE WITH TRANSMIT DIVERSITY", filed in the Korean Intellectual Property Office on May 16, 2003 and assigned Serial No. 2003-31334, the entire contents of which are incorporated herein by reference.

BACKGROUND OF THE INVENTION

1. Field of the Invention

The present invention relates to a mobile communication system. More particularly, the present invention relates to an apparatus and method for adapting different weights according to change in a Transmit (Tx) Diversity scheme when a Node B transmits data using a Tx Diversity scheme.

2. Description of the Related Art

As mobile telecommunication systems have been developing and the amount of data transmitted on such systems has been increasing, a third generation mobile telecommunication system providing data at a higher speed has recently been developed. As for the third generation mobile telecommunication system, a Wideband-Code Division Multiple Access (W-CDMA) format which is asynchronous has been widely used in Europe as a wireless access standard, and a Code Division Multiple Access-2000 (CDMA-2000) format which is synchronous has been widely used in North America as a wireless access standard. Typically, the mobile telecommunication system enables a plurality of User Equipments (UE's) to communicate via one Node B. However, phase distortion of a reception signal occurs in the mobile telecommunication system resulting in a fading phenomenon during transmission of high-speed data. The fading phenomenon causes an amplitude of a reception signal to be reduced from several tens of dBs to a few dBs. Therefore, if the distorted phase of the reception signal is not compensated for during a data demodulation process, an undesired information error occurs in the transmission data from a transmission end such that a Quality Of Service (QoS) of the mobile telecommunication system deteriorates. In order to transmit high-speed data without QoS deterioration, the fading phenomenon must be addressed. A variety of diversity schemes have been widely used to overcome the fading phenomenon.

Typically, a CDMA scheme uses a rake receiver for performing diversity reception using a delay spread of a channel signal. A general rake receiver uses a Receive (Rx) Diversity scheme for receiving a multi-path signal, and each finger of the rake receiver is assigned one signal path such that it performs a demodulation process. However, the above rake receiver based on a diversity scheme using the delay spread is inactive when a value of the delay spread is lower than a prescribed value. Also, a Time Diversity scheme using an interleaving operation and a coding operation is typically used for a Doppler spread channel. However, it is difficult to use the Time Diversity scheme in a low-speed Doppler spread channel.

Therefore, in order to solve the fading phenomenon, a Space Diversity scheme has been used for both a channel having a low delay spread, such as an indoor channel, and a channel having a low-speed Doppler spread, such as a walker channel. The Space Diversity scheme is indicative of a diversity scheme for use with at least two transmission and reception antennas. Specifically, if the magnitude of a signal transmitted via one antenna is reduced by the fading phenomenon, the Space Diversity scheme demodulates a transmission signal by receiving signals transmitted via the remaining antennas. The Space Diversity scheme is classified into a Receive Antenna Diversity scheme using a reception antenna and a Transmit Antenna Diversity scheme using a transmission antenna. However, because the Receive Antenna Diversity scheme is used for UEs, it is difficult to install a plurality of antennas for each UE due to the size and cost of each UE. Therefore, the Transmit Antenna Diversity scheme for installing many antennas to a Node B is preferably used.

The Transmit Diversity scheme controls a transmission end to transmit signals over multiple antennas, and controls a reception end to receive, demodulate, and combine output signals of individual antennas to overcome fading channels. The W-CDMA implements the Transmit Diversity scheme by adapting two antennas to the Node B according to specified communication standards.

The Transmit Antenna Diversity scheme uses a specific algorithm for receiving a downlink signal to obtain a diversity gain, and is classified into an open loop transmit diversity and a closed loop transmit diversity. The open loop transmit diversity is classified into a Time-Switched Transmit Diversity (TSTD), and a Space-Time Transmit Diversity (STTD), and the closed loop transmit diversity includes a Transmit Antenna Array (TxAA) scheme.

For the open loop transmit diversity, if a Node B encodes information bits and transmits them via a plurality of diversity antennas, the UE receives signals transmitted from the Node B and decodes the received signals such that a diversity gain is obtained.

For the closed loop transmit diversity, if the UE estimates and calculates channel environments through which signals transmitted via transmission antennas of a Node B will travel in the future, calculates weights of the antennas of the Node B on the basis of the calculated estimation values in order to obtain a maximal power value of a reception signal, and finally transmits the weights to the Node B via an uplink, the Node B receives the weights from the UE and applies each of the weights to each antenna, thereby adapting received weights to individual antennas. In this case, the Node B transmits a pilot signal for every antenna to measure a channel of the UE, and thereby the UE measures a channel using the pilot signal for every antenna and generates an optimal weight based on the measured channel information.

The closed loop transmit diversity method will hereinafter be described with reference to FIG. 1. FIG. 1 is a block diagram illustrating a TxAA-scheme transmitter indicative of a representative technique of the closed loop transmit diversity scheme.

A Dedicated Physical Control CHannel (DPCCH) for transmitting a plurality of control signals and a Dedicated Physical Data CHannel (DPDCH) for transmitting information signals are multiplexed to configure a Dedicated Physical CHannel (DPCH) 102. In this case, the DPCCH and the DPDCH are typically time-multiplexed in a downlink direction.

The multiplier 104 scrambles the DPCH signal using a scrambling code. The scrambled DPCH signal is multiplied by a predetermined weight W1 in the multiplier 106, and is multiplied by a predetermined weight W2 in the multiplier 108, such that the closed loop transmit diversity is applied to the scrambled DPCH signal. Separate calculation signals are transmitted over a first antenna 114 and a second antenna 116.

The closed loop transmit diversity scheme is classified into a first mode scheme and a second mode scheme according to weight use methods. Specifically, the first mode scheme (Mode 1) determines a weight by considering only a phase difference between signals received over the two antennas 114 and 116, and the second mode scheme (Mode 2) determines a weight by considering the phase difference and the magnitude difference between signals received over the two antennas 114 and 116.

Signals transmitted to the first and second antennas are multiplexed with unique pilot signals CPICH1 and CPICH2 assigned to every antenna in individual multiplexers 110 and 112, respectively, such that the state information of channel signals transmitted over individual antennas can be measured.

The Mobile Station (MS) receives signals from individual antennas, measures channel states of individual antennas using the pilot signals, and multiplies weights by pilot signals of two antennas, such that it determines a specific weight for maximizing a power level of a reception signal indicative of the sum of the multiplied results in association with individual antennas. Information of the weight is defined as predetermined sets. If the weight from among three available weights is adapted to a reception end, the reception end determines one weight for maximizing a necessary reception power. If information of the determined weight is transmitted over the feedback information (FBI) field of an uplink DPCCH message, the FBI message determination unit 118 analyzes the feedback information received from the reception end. The weight generator 120 generates weights W1 and W2 for every antenna, and multiplies the weights W1 and W2 by a DPCH signal to be transmitted.

The uplink DPCCH configuration and the FBI configuration will hereinafter be described with reference to FIGS. 2 and 3. FIG. 2 is a view illustrating a configuration of the uplink DPCCH. One frame of the uplink DPCCH comprises 15 slots, and each slot includes a pilot symbol, a Transmit Format Combination Indicator (TFCI) bit, a feedback information (FBI) symbol, and a downlink Transmit Power Control Commander (TPC). The pilot symbol is used as a channel estimation signal when data transmitted from the MS to the Node B is demodulated. The TFCI bit indicates which one of the Transport Format Combinations (TFCs) is applied to a downlink channel transmitted during a current transmission frame. The FBI symbol transmits feedback information according to the used Transmit Diversity scheme, and the TPC symbol is a symbol for controlling Downlink Channel Transmit Power. The uplink DPCCH is spread using an orthogonal code, and is transmitted to a destination. In this case, a Spreading Factor (SF) is fixed at a specific number, for example, 256.

FIG. 3 illustrates a configuration of an FBI symbol included in the uplink DPCCH. The FBI symbol is classified into an S field and a D field. The S field is indicative of a field for the STTD signal, and the D field is indicative of a field for the closed loop transmit diversity. Therefore, the MS transmits weight information over the D field of the uplink DPCCH's FBI symbol. The D field includes a maximum of 1 bit for every slot.

A channel for use in the W-CDMA communication system is mainly classified into a Physical Channel, a Transport Channel, and a Logical Channel according to signal processing of hierarchical information. The physical channel for spatially transmitting data is classified into a downlink physical channel and an uplink physical channel according to information transmission directions.

The Transmit Diversity scheme for use in individual physical channels is shown in the following Table 1:

TABLE 1

| Physical Channel Type | Open loop Transmit Diversity | | Closed loop Transmit Diversity | |
|---|---|---|---|---|
| | TSTD | STTD | Mode 1 | Mode 2 |
| P-CCPCH | X | ○ | X | X |
| SCH | ○ | X | X | X |
| S-CCPCH | X | ○ | X | X |
| DPCH | X | ○ | ○ | ○ |
| PICH | X | ○ | X | X |
| PDSCH | X | ○ | ○ | ○ |
| HS-PDSCH | X | ○ | ○ | X |
| HS-SCCH | X | ○ | ○ | X |
| AICH | X | ○ | X | X |
| CSICH | X | ○ | X | X |
| AP-AICH | X | ○ | X | X |
| CD/CA-ICH | X | ○ | X | X |
| DL-DPCCH for CPCH | X | ○ | ○ | ○ |

In this case, the principles for adapting the Transmit Diversity scheme to the physical channels will hereinafter be described.

1) According to the first principle, the STTD scheme and the closed loop transmit diversity scheme cannot be applied to the same physical channel at the same time.

2) According to the second principle, when adapting the Transmit Diversity scheme to one of downlinks, the Transmit Diversity scheme must be applied to the P-CCPCH and the SCH.

3) According to the third principle, a PDSCH and its associated DPCH must use the same Transmit Diversity scheme at all times.

4) According to the fourth principle, the HS-SCCH, the HS-PDSCH, and their associated DPCH must use the same Transmit Diversity scheme.

The UMTS system based on the W-CDMA scheme must combine DPCH signals transmitted from several Node Bs at a soft handover time. The Node Bs for transmitting the DPCH signals to be received at the same time must satisfy the following regulations associated with Transmit Diversity scheme usage according to prescribed standards.

1) According to the first regulation, the Node Bs use one Transmit Diversity scheme when transmitting a DPCH signal to a desired UE. Specifically, the Node Bs avoid duplication of the open loop transmit diversity scheme and the closed loop transmit diversity scheme.

2) According to the second regulation, if all the Node Bs currently providing UEs with necessary services do not use the Transmit Diversity scheme, a recently added Node B for DPCH transmission is not affected by conventional Node Bs in association with specific information indicative of a used or unused Transmit Diversity scheme.

3) According to the third regulation, if one or more Node Bs from among a plurality of Node Bs currently providing UEs with necessary services transmit the DPCH using the open loop transmit diversity scheme, the recently added Node B can transmit the DPCH using the open loop transmit diversity scheme or can also transmit the DPCH without using the transmit diversity scheme.

4) According to the fourth regulation, if one or more Node Bs from among a plurality of Node Bs currently providing UEs with necessary services transmit the DPCH using the closed loop transmit diversity Mode1 scheme, the recently added Node B can transmit the DPCH using the closed loop transmit diversity Mode1 scheme or can also transmit the DPCH without using the transmit diversity scheme.

5) According to the fifth regulation, if one or more Node Bs from among a plurality of Node Bs currently providing UEs with necessary services transmit the DPCH using the closed loop transmit diversity Mode2 scheme, the recently added Node B can transmit the DPCH using the closed loop transmit diversity Mode2 scheme or can also transmit the DPCH without using the transmit diversity scheme.

Upon receiving downlink DPCH signals from more than two Node Bs at a soft handover time, individual Node Bs are not affected by specific information indicating whether the Transmit Diversity scheme is adapted to the Node Bs. When using the Transmit Diversity scheme, the closed loop transmit diversity scheme and the open loop transmit diversity scheme cannot be used at the same time. In the case of using the closed loop transmit diversity scheme, the aforementioned Mode1 and Mode2 schemes cannot be used at the same time. A plurality of Node Bs for providing UEs with necessary services must select one scheme from among a plurality of Transmit Diversity schemes, and must use only the selected scheme.

A method for controlling the MS to generate weights will hereinafter be described. The MS performs channel estimation using the CPICH, and this channel estimation value configured in the form of a matrix H can be represented by the following equation 1:

$$H = [h_1, h_2]$$

With reference to Equation 1, $h_1$ and $h_2$ are channel estimation vectors for two transmission antennas, respectively. The MS selects weights $w_1$ and $w_2$ capable of maximizing the result value of the following equation 2 using the channel estimation vectors.

$$P = w^H H^H H w$$

With reference to Equation 2, w is $[w_1, w_2]^T$, and P is indicative of reception power when weight information is adapted to the first and second antennas in current channel environments. The MS searches for a weight for maximizing the reception power, and transmits the weight to the Node B.

FIG. 4 is a configuration of a Feedback Signal Message (FSM) transmitted from the MS to the Node B to establish the closed loop transmit diversity scheme. The FSM configuration is transmitted over the D field contained in the FBI field shown in FIG. 3. The FSM is classified into an $FSM_{ph}$ field indicative of phase information and an $FSM_{po}$ field indicative of magnitude information.

If the MS performs a handover function as described above, a Transmit Diversity scheme for use in the former Node B before performing the handover function may be different from the other Transmit Diversity scheme for use in the latter Node B after performing the handover function. Provided that the Transmit Diversity scheme of the former Node B is equal to that of the latter Node B, the MS need not change the Transmit Diversity scheme. Otherwise, provided that the Transmit Diversity scheme of the former Node B is different from that of the latter Node B, the MS must change the Transmit Diversity scheme according to handover situations.

If the MS changes the Transmit Diversity scheme, and particularly, if there arises a variation in mode of the closed loop transmit diversity scheme, the MS must establish an initial weight at a time of changing the mode to another mode.

The Node B must receive weight information capable of maximizing reception power in the MS, and transmit data using the received weight information. However, as shown in FIG. 4, the weight information comprises 2 bits when the closed loop transmit diversity scheme is set to Mode1, comprises 4 bits when the Transmit Diversity scheme is set to Mode2, and one bit is transmitted over one slot. The Node Bs take a predetermined time to receive all of the weight information transmitted from the MS in such a way that they can receive appropriate weights from the MS. Therefore, the Node B must transmit data to be transmitted prior to the predetermined time using a predetermined weight determined between the Node B and the MS. However current channel environments are not reflected in the aforementioned case, such that the weight for maximizing the reception power is not applied to the aforementioned case, and an optimum weight is not applied to signals generated until applying a weight where a channel situation is reflected, resulting in deterioration of system performance. In conclusion, a method must be developed for solving the aforementioned problems during a handover.

SUMMARY OF THE INVENTION

Therefore, the present invention has been made in view of the above problems, and it is an object of the present invention to provide an apparatus and method for minimizing deterioration of Transmit (Tx) Diversity performance when changing a Transmit Diversity scheme to another scheme.

It is another object of the present invention to provide an apparatus and method for assigning different weights to a first case where a closed loop transmit diversity mode is changed and a second case where there is no change in the Transmit Diversity scheme, resulting in effective Transmit Diversity implementation.

In accordance with one aspect of the present invention, the above and other objects can be accomplished by the provision of a method for controlling a Node B to change a Transmit Diversity scheme to another scheme in a mobile communication system including the Node B for transmitting data using the Transmit Diversity scheme and an Mobile Station (MS) for transmitting weights of antennas to the Node B to provide the Node B with maximum Transmit Diversity performance, such that it can implement a maximum Transmit Diversity. The method comprising the steps of determining whether there is a mode transition in the Transmit Diversity scheme upon receiving Transmit Diversity information from the MS; generating weights associated with individual antennas using a predetermined relationship between weights for use in different Transmit Diversity schemes if it is determined that the mode transition occurs in the Transmit Diversity scheme; and transmitting data using the generated weights.

In accordance with another aspect of the present invention, there is provided a data transmission apparatus for implementing a maximum Transmit Diversity when changing a current Transmit Diversity scheme to another scheme in a mobile communication system including a Node B for transmitting data using a Transmit Diversity scheme and an Mobile Station (MS) for transmitting weights of a plurality of antennas to the Node B to provide the Node B with maximum Transmit Diversity performance. The apparatus comprises a mode transition determination unit for determining whether there is a mode transition in the Transmit Diversity scheme upon receiving Transmit Diversity information from the MS; a weight generator for generating weights associated with individual antennas using a predetermined relationship between weights of different Transmit Diversity schemes according to the determination result of the mode transmission determination unit, and transmitting the generated weights to a signal processor; and a signal processor for transmitting data using the generated weights.

BRIEF DESCRIPTION OF THE DRAWINGS

The above and other objects, features and other advantages of the present invention will be more clearly understood from the following detailed description taken in conjunction with the accompanying drawings, in which.

In the drawings, it should be noted that the same or similar elements are denoted by the same reference numerals even though they are depicted in different drawings.

DETAILED DESCRIPTION OF THE PREFERRED EMBODIMENTS

Embodiments of the present invention will be described in detail with reference to the annexed drawings. In the following description, a detailed description of known functions and configurations incorporated herein will be omitted for conciseness.

The closed loop transmit diversity Mode1 and the closed loop transmit diversity Mode2 will hereinafter be described.

Figure 5:
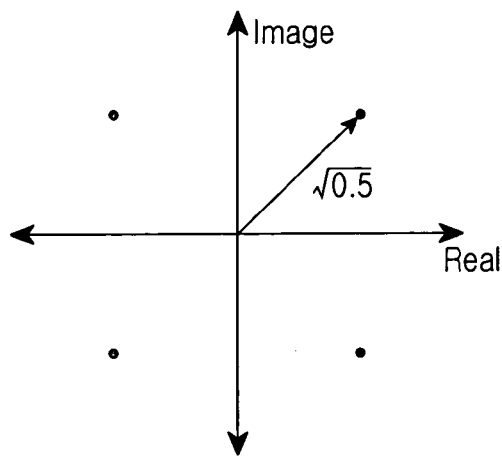
FIG. 5 is a view illustrating weights for a closed loop transmit diversity Mode1 scheme based on a constellation.

FIG. 5 shows weights for use in the second antenna (Antenna 2) of the closed loop transmit diversity Mode1. Individual weights have the same sizes, but a phase difference of 90° occurs in the weights. The set of weights for the first and second antennas applied to the Mode1 scheme can be represented by the following equation 3:

$$w_1 = \frac{1}{\sqrt{2}}, w_2 = \left[\frac{1+j}{2}, \frac{1-j}{2}, \frac{-1+j}{2}, \frac{-1-j}{2}\right]$$

With reference to Equation 3, the weight $w_1$ for the first antenna indicates only magnitude information, and the weight $w_2$ for the second antenna indicates magnitude and phase information. The weights $w_1$ have the same magnitude of $$\frac{1}{\sqrt{2}}$$

as shown in Equation 3.

FIG. 5 is a constellation illustrating weight sets for the second antenna of the closed loop transmit diversity Mode1 scheme. The weights for use in the first antenna of the Mode1 scheme each have a phase of 0 as described above. The MS calculates a parameter of $w_2$ having the maximum reception power using Equation 2. The Mobile Station (MS) calculates reception power values associated with all of parameters $w_2$ using Equation 2 to acquire the maximum reception power, and recognizes weights having the maximum reception power from among the calculated reception power values. The MS transmits the weight associated with the recognized second antenna and the other weight associated with the first antenna at the same time. However, the weight for the first antenna is fixed to a constant value, such that the MS can transmit only the weight for the second antenna to the Node B. A specific case where the MS transmits only the weight for the second antenna will hereinafter be described. Weights acquired from the MS are transmitted to the Node B over an uplink Dedicated Physical Control CHannel (DPCCH). The MS for the Mode2 scheme transmits only the phase information, such that it selectively transmits only a phase component from among a Feedback Signal Message (FSM) configuration shown in FIG. 4, and uses only 2 bits to transmit the phase information.

As stated above, the FSM-associated information is designed to transmit only one bit for every slot. Specifically, if a slot number is denoted by an even number, it transmits either one of 0 and π. If the slot number is denoted by an odd number, it transmits either one of π/2 or −π/2. The Node B acquires phase information from a corresponding slot using an FSM bit of a Feedback Information (FBI) field received over the uplink DPCCH. The Node B acquires weight information from the MS using the phase information. The weight information transmitted from the MS in slot units is shown in the following Table 2:

TABLE 2

| Slot# | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| FSM 0 | 0 | 0 | π/2 | 0 | π/2 | 0 | π/2 | 0 | π/2 | 0 | π/2 | 0 | π/2 | 0 | π/2 | 0 |
| 1 | π | −π/2 | π | −π/2 | π | −π/2 | π | −π/2 | π | −π/2 | π | −π/2 | π | −π/2 | π |

The following Equation 4 depicts generalized weight information transmitted from the MS:

$$w_1 = \frac{1}{\sqrt{2}} \quad (const.),$$

$$w_2 = \frac{\sum_{i=n-1}^{n} \cos(\phi_i)}{2} + j\frac{\sum_{i=n-1}^{n} \sin(\phi_i)}{2}, \phi_i \in \{0, \pi, \pi/2, -\pi/2\}$$

Upon receiving feedback information from a specific slot, the Node B changes weight information acquired from a Feedback Signal Message (FSM) signal received from a previous slot of the specific slot to another information. The Node B uses $$w_2 = \frac{1+j}{2}$$

as an initial weight for the second antenna until receiving the first FSM signal. If the Node B receives the first FSM information, the weight for the second antenna is calculated using the following equation 5:

$$w_2 = \frac{\cos(\pi/2) + \cos(\phi_0)}{2} + j\frac{\sin(\pi/2) + \sin(\phi_0)}{2}$$

With reference to Equation 5, $\phi_0$ is indicative of FSM information firstly received from the Node B, and is a transmission value of a 0-numbered slot. The Node B updates weights using the transmission information of the 0-numbered slot and information stored as the initial weight. Upon receiving FSM information from a 1-numbered slot, the Node B updates weight information using the transmission information from the 1-numbered slot and the weight information that was updated by the transmission information of the 0-numbered slot. The Node B for use in the closed loop transmit diversity Mode2 scheme requires about four slots considering a round trip delay such that it can establish weight information according to channel situations.

Figure 1:
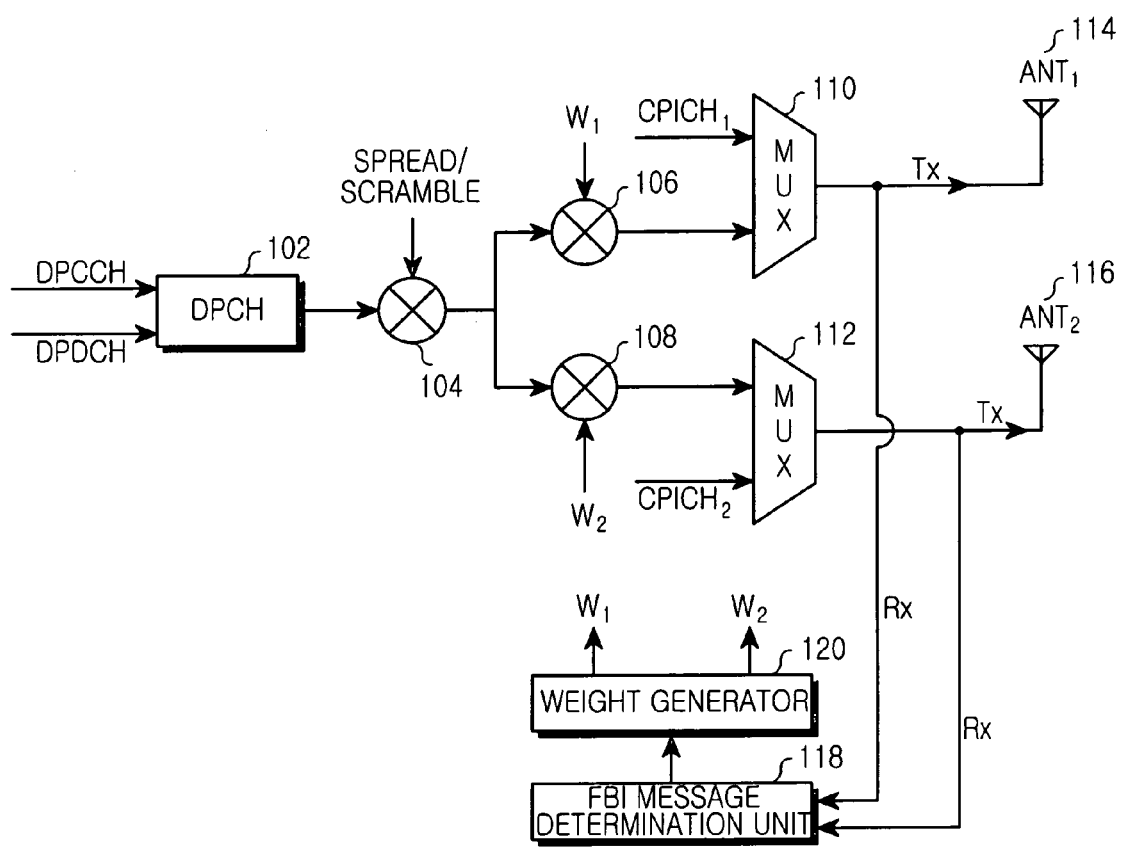
FIG. 1 is a block diagram illustrating a transmitter for implementing a conventional closed loop transmit diversity.
Figure 2:
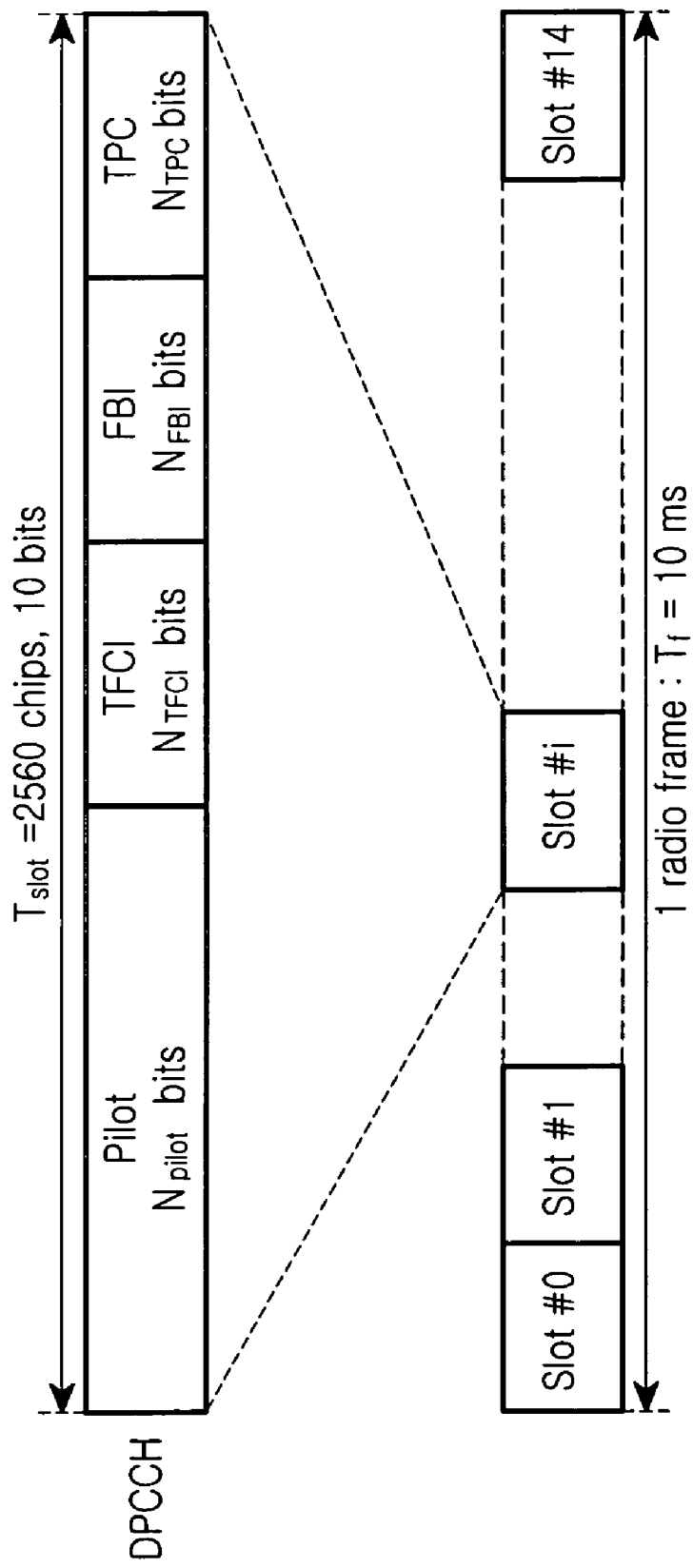
FIG. 2 is a diagram illustrating an uplink Dedicated Physical Control CHannel (DPCCH) configuration.
Figure 3:
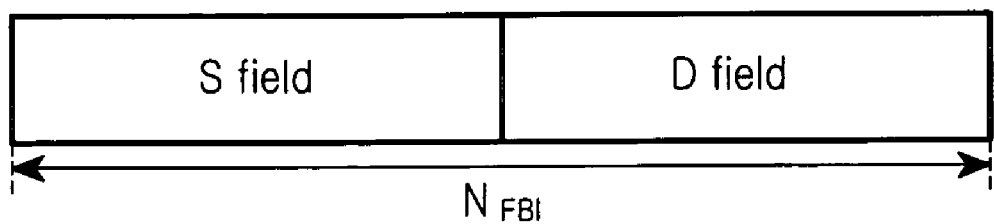
FIG. 3 is a diagram illustrating a Feedback Information (FBI) field configuration of the uplink DPCCH signal.
Figure 4:
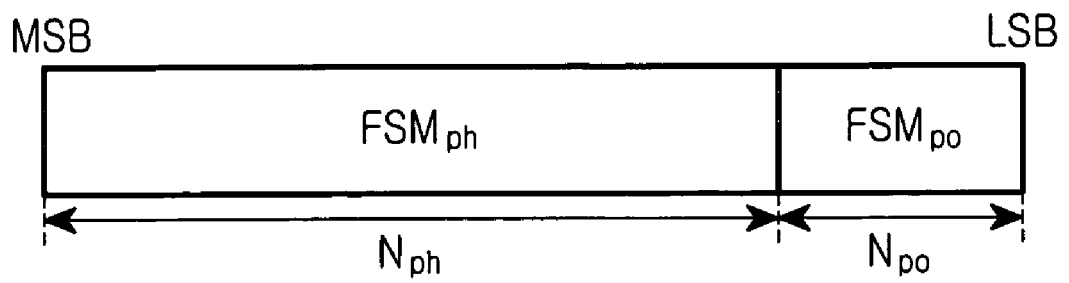
FIG. 4 is a view illustrating a Feedback Signal Message (FSM) configuration transmitted over the FBI field.
Figure 6:
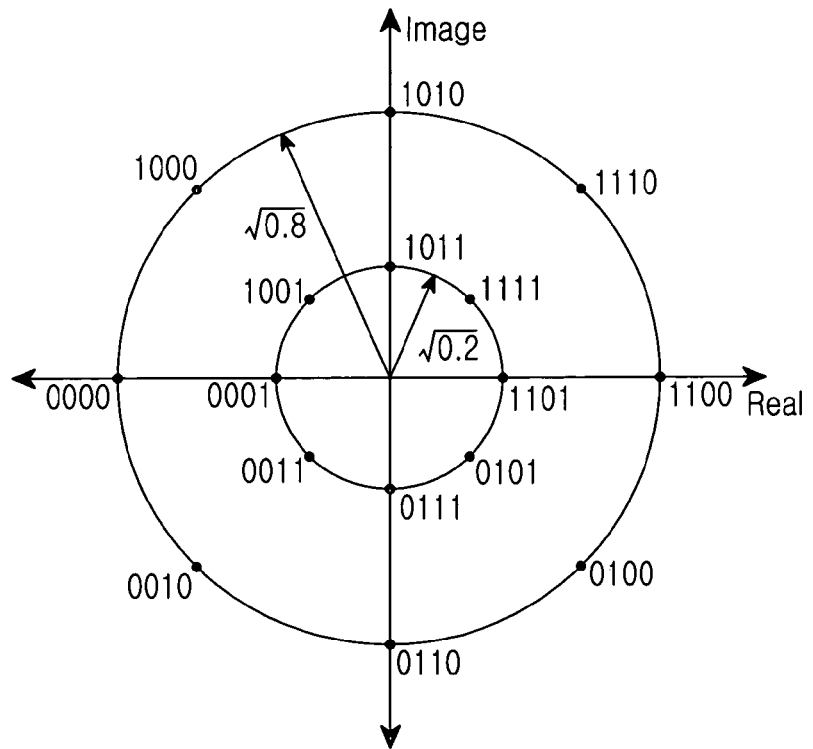
FIG. 6 is a conceptual diagram illustrating weights for use in a closed loop transmit diversity Mode2 scheme based on a constellation.

The closed loop transmit diversity Mode2 scheme will hereinafter be described. FIG. 6 is a diagram illustrating weights for use in the closed loop transmit diversity Mode2 scheme based on a constellation. As shown in FIG. 6, weight information for use in the Mode2 scheme is adjusted differently according to their magnitude and phase information. FIG. 4 shows the FSM information composed of a phase section and a magnitude section. The weight information for use in the Mode2 scheme can be denoted by the following equation 6:

With reference to Equation 6, the first antenna includes only magnitude information, and the second antenna includes not only magnitude information but also phase information. Four bits are required to receive all of weight information for use in the Mode2 scheme. The MS and the Node B each use a progressive update method to reduce a time delay of 4 slots. The progressive update method determines the next FSM bit on the basis of the pre-transmitted FSM bit.

Figure 7:
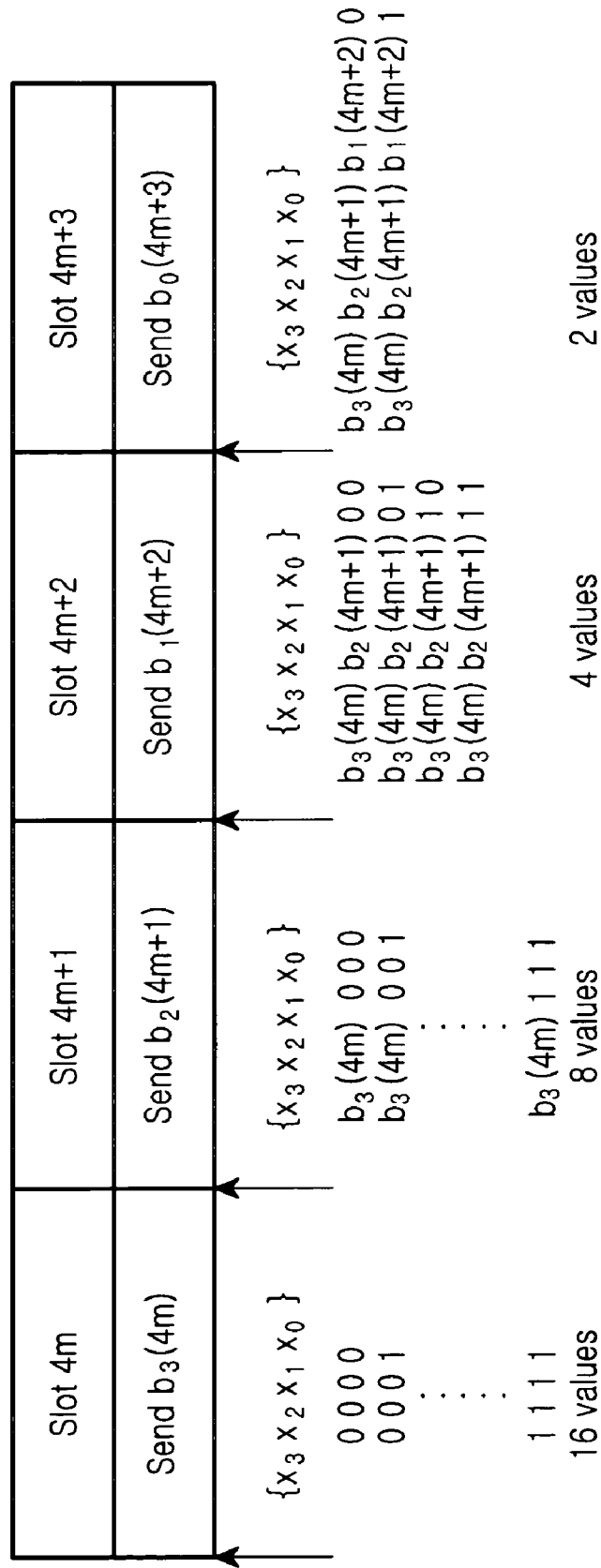
FIG. 7 is a diagram illustrating a method for transmitting a weight determined by an MS of the closed loop transmit diversity Mode2 using an FSM.

FIG. 7 is an example in which the MS transmits the FSM bit using the progressive update method. The progressive update method for use in the MS will hereinafter be described with reference to FIGS. 6 and 7.

FIG. 7 shows four slots and FSM bits transmitted from the four slots. The four slots comprise 4m, 4m+1, 4m+2, and 4m+3. The MS included in the slot '4m' transmits the value of $b_3$, and the MS contained in the slot '4m+1' transmits the value of $b_2$. The MS contained in the slot '4m+2' transmits the value of $b_1$, and the MS contained in the slot '4m+3' transmits the value of $b_0$. The MS calculates a weight having the maximum reception power using Equation 2. As shown in Equation 6, if the first antenna includes the value of $\sqrt{0.8}$, the second antenna 2 includes the magnitude of $\sqrt{0.2}$. If the first antenna includes the value of $\sqrt{0.2}$, the second antenna 2 includes the magnitude of $\sqrt{0.8}$. Therefore, the MS performs a hypothetical test for a total of 16 weights to transmit the value of $b_3$ in the slot '4m', and determines a weight having the maximum reception power. In association with the determined weight, the MS transmits a bit corresponding to the value of $b_3$ from among four bits contained in the slot '4m'. The value of $b_3$ corresponds to the value of $x_3$ as shown in FIG. 7. If the value of $x_3$ has been determined, the MS determines upper and lower positions on the basis of a real-number axis, as shown in the constellation of FIG. 6.

The MS having determined the value of $x_3$ in the slot '4m' determines the value of $x_2$ in the slot '4m+1'. The MS measures the maximum reception power in association with only weights included in the position determined by the value of $x_3$, instead of measuring the maximum reception power in association with all of weights. Therefore, the MS measures the reception power in association with only eight weights, determines one weight having the maximum reception power, and determines the value of $x_2$ to be transmitted from the MS after the reception power has been measured. The MS having determined the value of $x_2$ in the slot '4m+1' determines the value of $x_1$ in the slot '4m+2'. The MS measures the reception power in association with only weights contained in the position determined by the values of $x_3$ and $x_2$, instead of measuring reception powers in association with all of weights. Therefore, the MS measures the reception power in association with only four weights, determines one weight having the maximum reception power, and determines the value of $x_1$ to be transmitted from the MS after the reception power has been measured. FSM phase information transmitted from the MS is shown in the following Table 3:

$$w_1 = \{\sqrt{0.8}, \sqrt{0.2}\},$$

$$w_2 = \begin{cases} \sqrt{0.2}\,e^{j0\pi}, \sqrt{0.2}\,e^{j\frac{\pi}{4}}, \sqrt{0.2}\,e^{j\frac{\pi}{2}}, \sqrt{0.2}\,e^{j\frac{3\pi}{4}}, \sqrt{0.2}\,e^{j\pi}, \sqrt{0.2}\,e^{-j\frac{\pi}{4}}, \sqrt{0.2}\,e^{-j\frac{\pi}{2}}, \sqrt{0.2}\,e^{-j\frac{3\pi}{4}}, \\ \sqrt{0.8}\,e^{j0\pi}, \sqrt{0.8}\,e^{j\frac{\pi}{4}}, \sqrt{0.8}\,e^{j\frac{\pi}{2}}, \sqrt{0.8}\,e^{j\frac{3\pi}{4}}, \sqrt{0.8}\,e^{j\pi}, \sqrt{0.8}\,e^{-j\frac{\pi}{4}}, \sqrt{0.8}\,e^{-j\frac{\pi}{2}}, \sqrt{0.8}\,e^{-j\frac{3\pi}{4}}, \end{cases}$$

TABLE 3

| FSM phase information | Phase difference between antennas |
|---|---|
| --- | Maintain π or predetermined phase difference |
| 0-- | π |
| 1-- | 0 |
| 00- | π |
| 01- | −π/2 |
| 11- | 0 |
| 10- | π/2 |
| 000 | π |
| 001 | −3π/4 |
| 010 | −π/2 |
| 011 | −π/4 |
| 100 | 0 |
| 101 | π/4 |
| 110 | π/2 |
| 111 | 3π/4 |

The MS having determined the value of $x_1$ in the slot '4m+2' determines the value of $x_0$ he slot '4m+3'. The value of $x_0$ is indicative of the magnitude information. The MS measures the reception power in association with only ed in the position determined by the values of $x_3$, $x_2$, and $x_1$, instead of measuring reception powers in association with all of weights. Therefore, the MS measures the reception power in association with only two weights, determines one weight having the maximum reception power, and determines the value of $x_0$ to be transmitted from the MS after the reception power has been measured. FSM magnitude information transmitted from the value of $x_0$ is shown in the following Table 4:

TABLE 4

| FSM magnitude information | Transmit Power of first antenna | Transmit Power of second antenna |
|---|---|---|
| 0 | 0.2 | 0.8 |
| 1 | 0.8 | 0.2 |

Figure 8:
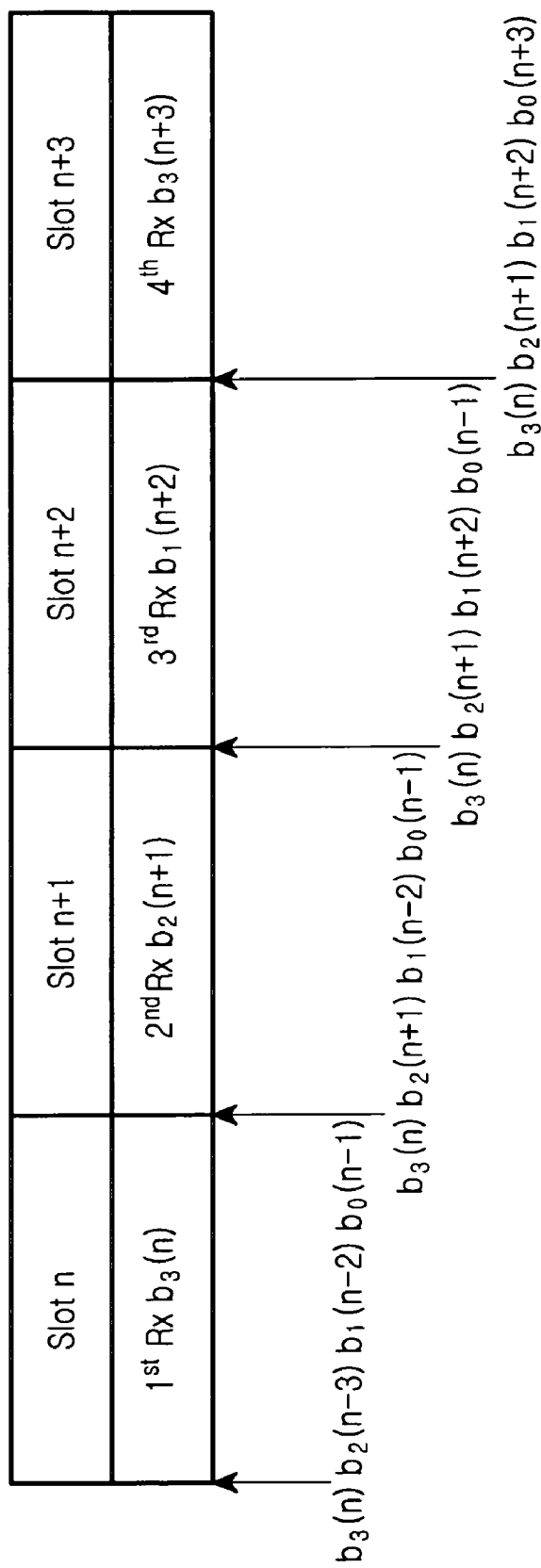
FIG. 8 is a diagram illustrating a method for determining a weight using an FSM received from the Node B of the closed loop transmit diversity Mode2.

FIG. 8 is a diagram illustrating a process for determining a weight upon receiving FSM information from the Node B for use with the progressive update method. Referring to FIG. 8, the Node B determines a necessary weight using not only a predetermined weight but also information received from a specific slot. A weight vector for use in the first and second antennas in the specific slot of the Node B is denoted by the following equation 7 indicative of a simplified configuration of Equation 6:

$$w = \begin{bmatrix} \sqrt{power\_ant1} \\ \sqrt{power\_ant2} \exp(j\ phase\_diff) \end{bmatrix}$$

Before the Node B receives the first FSM bit from the MS, individual Transmit Powers of the first antenna and the second antenna are each maintained at a specific value of $\sqrt{0.5}$. Before the Node B receives the first FSM phase information from the MS, a phase difference between the first antenna and the second antenna is maintained at a specific value of π. The Node B determines the FSM phase information transmitted from the MS using the above Table 3.

A representative example of the aforementioned method will hereinafter be described with reference to FIG. 6 and the following Table 5:

TABLE 5

| C | D | E | F | G |
|---|---|---|---|---|
| 1000 | 1110 | 1100 | 1100 | 1101 |
| 1010 | 1100 | 1101 | | |
| 1110 | 1111 | | | |
| 1100 | 1101 | | | |
| 1001 | | | | |
| 1011 | | | | |
| 1111 | | | | |
| 1101 | | | | |

It is assumed that the first antenna includes the weight 'A' and the second antenna includes the weight 'B' during operation of an initial closed loop transmit diversity Mode2. Provided that the value of 1 is received in the slot '4m' in the case of the second antenna, the weight of the second antenna moves to the position 'C' of the first and second quadrants. The MS measures reception powers of 8 weights contained in the first and second quadrants, and determines one weight for maximizing the reception power. The MS determines to transmit the value of 1 to the slot '4m+1' on the basis of the determined weight. If the Node B receives the value of 1 in the slot '4m+1', the determined weight moves to the position 'D' contained in the first quadrant. The MS measures reception powers of four weights contained in the first quadrant, and determines one weight having the maximum reception power according to the measurement result. The MS decides to transmit the value of 0 to the slot '4m+2' on the basis of the determined weight. If the Node B receives the value of 0 in the slot '4m+2', the determined weight moves to the position 'E' contained in the fourth quadrant. Finally, the MS measures reception powers of two weights indicative of the magnitude information in the first quadrant, and determines one weight having the maximum reception power according to the measurement result. The MS determines to transmit the value of 0 to the slot '4m+3' on the basis of the determined weight. If the Node B receives the value of 0 in the slot '4m+3', the determined weight moves to the position 'F' contained in the first quadrant, and the first antenna moves to the position 'G' contained in the first quadrant. Thereafter, information units for every slot are sequentially received such that a weight can be updated with a new weight.

Figure 9:
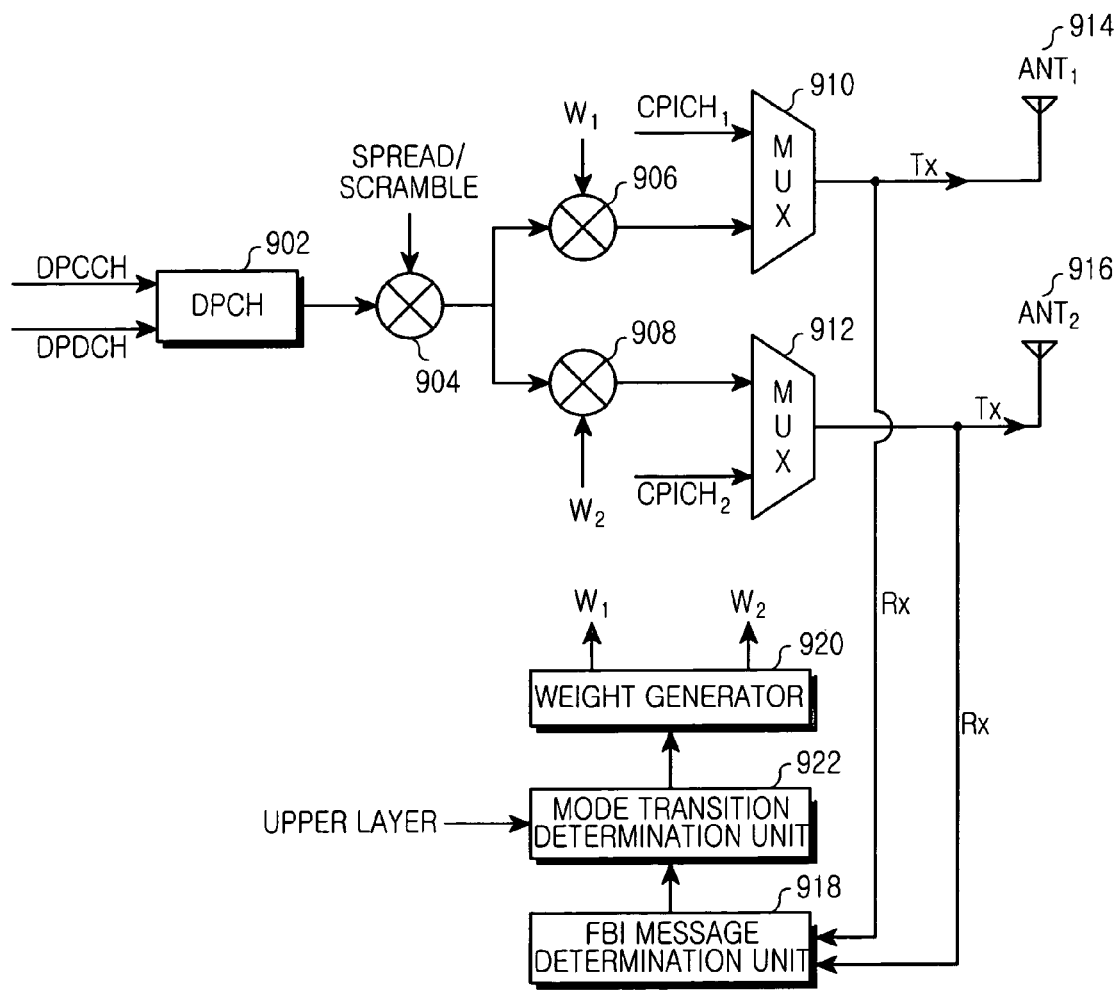
FIG. 9 is a block diagram illustrating a transmitter for implementing a closed loop transmit diversity in accordance with an embodiment of the present invention.

FIG. 9 is a block diagram illustrating a transmitter based on the Transmit Antenna Array (TxAA) scheme used as a representative example of closed loop transmit diversity implementation techniques.

A DPCCH comprises a plurality of control signals and a Dedicated Physical Data CHannel (DPDCH) comprising data signals are multiplexed to configure a Dedicated Physical CHannel (DPCH) 902. In this case, the DPCCH and the DPDCH are generally time-multiplexed in a downlink direction.

The multiplier 904 scrambles the DPCH signal using a scrambling code. The scrambled DPCH signal is multiplied by a predetermined weight W1 in the multiplier 906, and is multiplied by a predetermined weight W2 in the multiplier 908, such that the closed loop transmit diversity is applied to the scrambled DPCH signal. Individual calculation signals are transmitted over a first antenna 914 and a second antenna 916.

The closed loop transmit diversity scheme is classified into a first mode scheme and a second mode scheme according to weight use methods. Specifically, the first mode scheme (Mode 1) determines a weight by considering only a phase difference between signals received over the two antennas 914 and 916, and the second mode scheme (Mode 2) determines a weight considering not only the phase difference but also the magnitude difference between signals received over the two antennas 914 and 916. The FBI message determination unit 918 analyzes an FBI message transmitted over the uplink DPCCH, and transmits the analyzed result to the mode conversion determination unit 922. The mode transition determination unit 922 determines whether a Transmit Diversity scheme is changed to another scheme upon receiving a Transmit Diversity scheme signal from the upper layer. Specifically, the mode transition determination unit 922 determines whether the Transmit Diversity scheme is changed from the Transmit Diversity Mode1 to the Transmit Diversity Mode2, or is changed from the Transmit Diversity Mode2 to the Transmit Diversity Mode1. In other words, if there arises a variation between Transmit Diversity modes, the FBI message determination unit 918 receives a received FSM bit and weight information of individual previous antennas, and determines individual antennas' weights to be initially applied after the lapse of a mode transition time. The weight generator 920 generates a predetermined weight according to the mode transition information, and transmits the generated weight to the multipliers 906 and 908. The weight generator 920 having received information indicative of no mode transition from the mode transition determination unit 922 generates a weight to be used for the Node B using a typical weight generation method.

The signal transmitted to the first antenna is multiplexed with a unique pilot channel signal CPICH1 of the first antenna by means of the multiplexer 910, and the other signal transmitted to the second antenna is multiplexed with a unique pilot channel signal CPICH2 of the second antenna by means of the multiplexer 912. The pilot channel signal is indicative of a channel signal commonly received in all of users, and is adapted to perform a demodulation operation and to measure wireless channel state information.

A method for generating weights in response to mode transition will hereinafter be described. A first case for converting the closed loop transmit diversity Mode2 into the closed loop transmit diversity Mode1, and a second case for converting the closed loop transmit diversity Mode1 into the closed loop transmit diversity Mode2 will hereinafter be described in detail. If the mode transition determination unit 922 of FIG. 9 receives a Transmit Diversity scheme-associated signal from the upper layer at a radio link reconfiguration time of the DPCH, and compares the Transmit Diversity scheme associated with the received signal with a previous Transmit Diversity scheme, such that such mode transition operations can be established. Firstly, the aforementioned first case will hereinafter be described.

Figure 10:
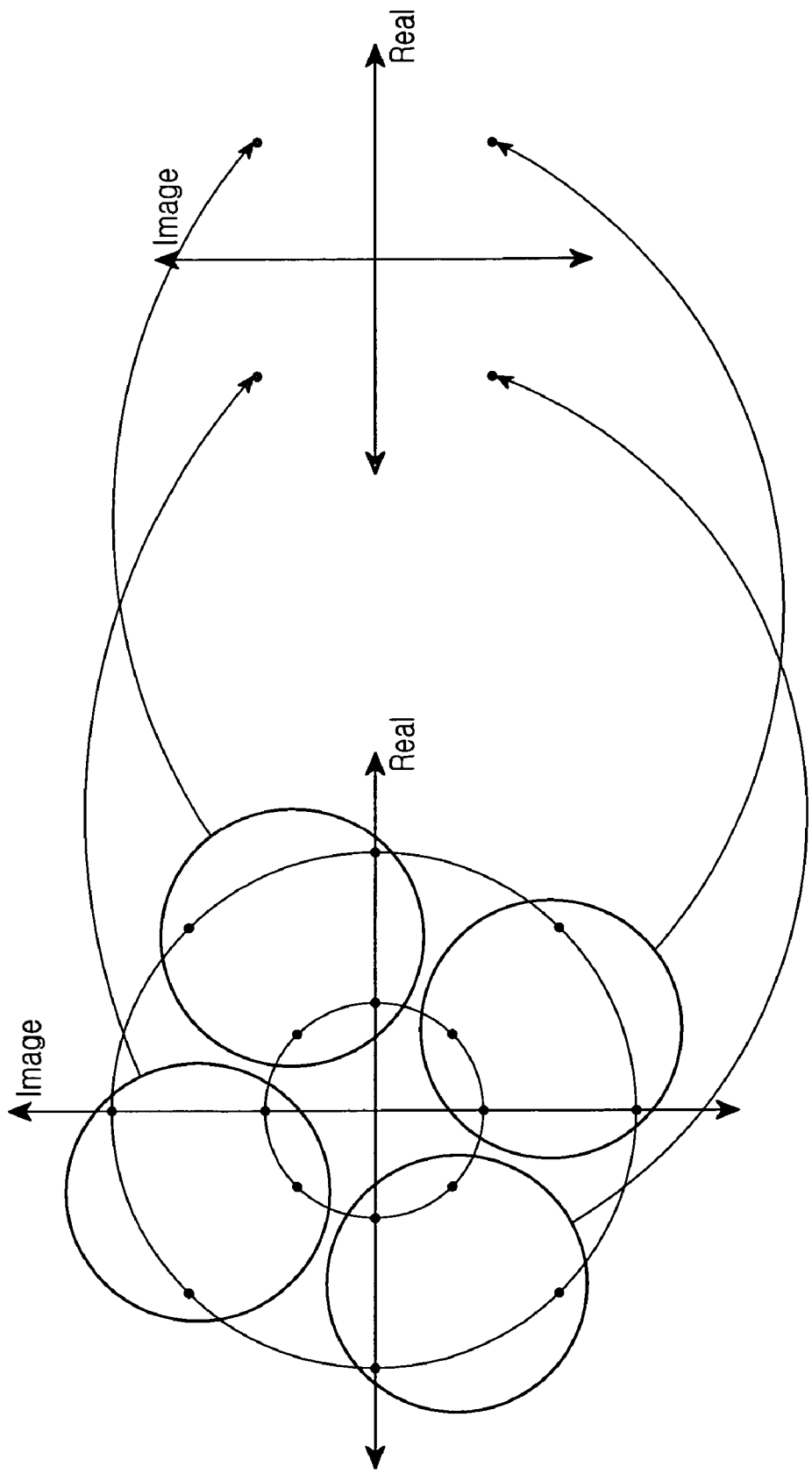
FIG. 10 is a diagram illustrating a method for converting weights of the closed loop transmit diversity Mode2 into weights of the closed loop transmit diversity Mode1 in accordance with an embodiment of the present invention.

FIG. 10 is a diagram illustrating a method for converting weights of the closed loop transmit diversity Mode2 into weights of the closed loop transmit diversity Mode1 in accordance with an embodiment of the present invention.

Referring to FIG. 10, the Node B determines a weight to be used after the lapse of a mode transition time with reference to previous weight information used before the mode transition time. The weights for use in the Mode2 are grouped into the same number of weights for use in the Mode1. Although such a grouping method can be freely determined, the following description will hereinafter be described with reference to FIG. 10 for the convenience of description. As shown in FIG. 10, the grouping of weights available for the Mode2 is performed using weights contained in the same quadrant. Upon receiving previous weight information and FSM bit information received just before the mode transition time, weight information to be used for the Transmit Diversity Mode2 is firstly determined. A weight to be initially used for the Mode1 is determined using a phase of the determined weight information.

The weights of the first quadrant from among a plurality of weights available for the Mode2 correspond to weights contained in the first quadrant. Weights contained in the second quadrant from among a plurality of weights available for the Mode2 correspond to weights contained in the second quadrant. The weights contained in the third quadrant from among a plurality of weights available for the Mode2 correspond to weights contained in the third quadrant. The weights contained in the fourth quadrant from among a plurality of weights available for the Mode2 correspond to weights contained in the fourth quadrant. A representative example for converting weights available for the Mode2 into other weights available for the Mode1 is represented by the following equation 8:

$$w_1 = \frac{1}{\sqrt{2}}$$

$$w_2 = \begin{cases} 0 \leq \theta < \frac{\pi}{2} : \frac{1+j}{2} \\ \frac{\pi}{2} \leq \theta < \pi : \frac{-1+j}{2} \\ \pi \leq \theta < \frac{3\pi}{2} : \frac{-1-j}{2} \\ \frac{3\pi}{2} \leq \theta < 2\pi : \frac{1-j}{2} \end{cases}$$

With reference to FIG. 8, θ is indicative of a phase difference between the first antenna and the second antenna in the Mode2. As can be seen from Equation 8, a weight for use in the second antenna of the Mode1 is determined by considering only the phase difference between the first and second antennas.

Weights determined by the method of FIG. 10 are used until the FSM bit measured by the MS in the Mode1 is transmitted over an uplink DPCCH and the transmitteed FSM bit is adapted to the Node B. The Node B having received the FSM bit from the MS updates a weight with a new weight using a method similar to the method described in the first example using FIG. 6 and Equation 5.

Figure 11:
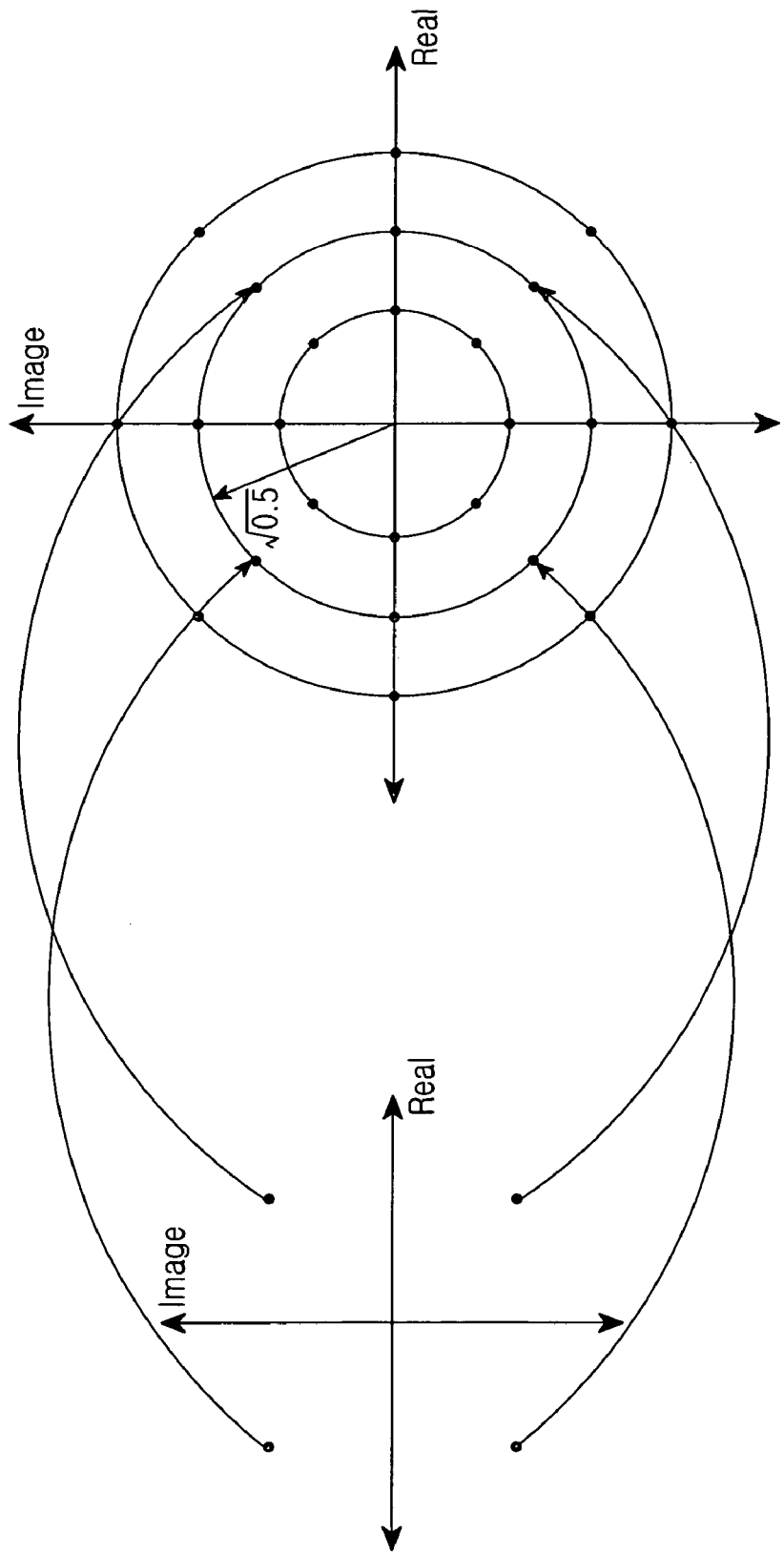
FIG. 11 is a diagram illustrating a method for converting weights of the closed loop transmit diversity Mode1 into weights of the closed loop transmit diversity Mode2 in accordance with an embodiment of the present invention.

FIG. 11 is a diagram illustrating a method for converting weights of the closed loop transmit diversity Mode1 into weights of the closed loop transmit diversity Mode2 in accordance with an embodiment of the present invention. As stated above, the weights for use in the Mode1 includes only phase information, but other weights for use in the Mode2 includes not only magnitude but also phase information. In order to determine weights for use in the Mode2 using weights for use in the Mode1, magnitude information associated with weights must be established at the mode transition time. The value of $\sqrt{0.5}$ is adapted as magnitude information of the weights for use in the Mode2, as shown in FIG. 11. However, although the magnitude information can be freely determined by a user's selection, it should be noted that the magnitude information is generally determined to be either one of values $\sqrt{0.2} \sim \sqrt{0.8}$. The relationship between weights established when the Transmit Diversity is changed from the Mode1 to the Mode2 can be represented by the following equation 9:

$$w_1 = \sqrt{0.5} \quad w_2 = \sqrt{0.5}\, e^{\frac{j\phi}{4}} = \begin{cases} \dfrac{1+j}{2}, \theta = \dfrac{\pi}{4} \\ \dfrac{-1+j}{2}, \theta = \dfrac{3\pi}{4} \\ \dfrac{-1-j}{2}, \theta = -\dfrac{3\pi}{4} \\ \dfrac{1-j}{2}, \theta = -\dfrac{\pi}{4} \end{cases}$$

With reference to Equation 9, θ is indicative of a phase difference between the first antenna and the second antenna in the Mode1, and φ is indicative of a phase difference between the first antenna and the second antenna. Based on the above Equation 9, the phase difference between individual weights of the first and second antennas to be used for the Mode2 is determined to be a phase difference between individual weights of the first and second antennas used for the Mode1. A process for storing FSM bit information associated with a previously-setup weight is performed. In this case, magnitude information is not determined yet, such that three FSM bits indicative of phase information are determined using Table 3.

Weights determined by the method of FIG. 11 are used until the FSM bit determined by a specific weight, having been determined by the MS considering the Mode2 situation, is transmitted over an uplink DPCCH's FBI field and the transmitted FSM bit is adapted to the Node B. The Node B having received the FSM bit from the MS updates a weight using the method of FIG. 8. The Node B adapts the same Transmit Power to the first and second antennas until receiving information indicative of magnitude information contained in the FSM bit. The Node B having received the phase information from among the FSM bit transmitted from the MS updates its weight using Table 3. The Node B having received magnitude information from among the FSM bit transmitted from the MS updates its weight using Table 4.

The case for converting the open loop transmit diversity scheme into the closed loop transmit diversity scheme can be carried out using the following simple procedures. The mode transition determination unit 922 determines whether a Transmit Diversity scheme is changed to another Transmit Diversity scheme upon receiving a Transmit Diversity scheme signal from the upper layer. Specifically, the mode transition determination unit 922 determines whether the open loop transmit diversity scheme is changed to the closed loop transmit diversity scheme, or determines whether the closed loop transmit diversity scheme is changed to the open loop transmit diversity scheme. Specifically, in the case where the open loop diversity scheme is changed to the closed loop transmit diversity scheme, the mode transition determination unit 922 transmits information indicative of the mode transition to the weight generator 920. Upon receipt of the determination result from the mode transition determination unit 922, the weight generator 920 determines the value of A contained in the constellation indicative of weight information to be a weight such that it can generate the value of A serving as such a weight. Thereafter, phase and magnitude information, or only phase information is updated by weight information received from the MS, resulting in a new weight. Upon receipt of the new weight, data is transmitted to individual antennas while being classified according to the antennas by means of the weight generator 920.

The other case for converting the closed loop transmit diversity scheme into the open loop transmit diversity scheme need not generate additional weights for antennas.

As apparent from the above description, if there arises a transition between closed loop Transmit Diversity modes from among a variety of Transmit Diversity schemes, embodiments of the present invention determine a weight to be used for an initial transition time in the changed mode using previously-used weight information, such that it can reflect wireless channel state information in the changed mode, resulting in minimized deterioration of the Transmit Diversity performance.

Although the embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for controlling a Node B to change a Transmit Diversity scheme to another scheme in a mobile communication system including the Node B for transmitting data using the Transmit Diversity scheme and a Mobile Station (MS) for transmitting weights of antennas to the Node B to provide the Node B with maximum Transmit Diversity performance, such that it can implement a maximum Transmit Diversity, the method comprising the steps of:

determining whether there is a mode transition in the Transmit Diversity scheme upon receiving Transmit Diversity information, wherein the mode transition comprises a transition between a Mode1 scheme and a Mode2 scheme comprised in an open loop transmit diversity scheme or a Mode1 scheme and a Mode2 scheme comprised in a closed loop transmit diversity scheme, or a transition between the open loop transmit diversity scheme and the closed loop transmit diversity scheme;

generating weights associated with individual antennas using a predetermined relationship between weights selected for use depending on the determined mode transition, if it is determined that the mode transition occurs in the Transmit Diversity scheme;

transmitting data using the generated weights; and associating a weight of a Transmit Diversity scheme used before the mode transition with a weight of a Transmit Diversity scheme to be used after the mode transition, such that the weights of the Transmit Diversity schemes are positioned in a same quadrant included in a constellation indicative of weight information.

2. The method according to claim 1, further comprising the step of:

generating weights using a predetermined relationship between the weights of the different Transmit Diversity schemes if the open loop transmit diversity scheme is changed to the closed loop transmit diversity scheme.

3. The method according to claim 2, wherein the step of generating the weights includes the step of:

updating either phase information or phase and magnitude information in the weights generated by the predetermined relationship according to the Transmit Diversity information, thereby generating weights for use in individual antennas each having a maximum Transmit Diversity.

4. The method according to claim 1, wherein the closed loop transmit diversity schemes each comprise the Mode1 scheme including only phase information, and the Mode2 scheme including phase and magnitude information.

5. The method according to claim 4, wherein the weights associated with individual antennas of the Mode1 scheme are denoted by the following equation:

$$w_1 = \frac{1}{\sqrt{2}}, w_2 = \left[\frac{1+j}{2}, \frac{1-j}{2}, \frac{-1+j}{2}, \frac{-1-j}{2}\right]$$

where $w_1$ is indicative of a weight for use in a reference antenna, and $w_2$ is indicative of weights for use in antennas other than the reference antenna.

6. The method according to claim 4, wherein the weights associated with individual antennas of the Mode2 scheme are denoted by the following equation:

$$w_1 = \{\sqrt{0.8}, \sqrt{0.2}\},$$

$$w_2 = \begin{Bmatrix} \sqrt{0.2}\,e^{j0\pi}, \sqrt{0.2}\,e^{j\frac{\pi}{4}}, \sqrt{0.2}\,e^{j\frac{\pi}{2}}, \sqrt{0.2}\,e^{j\frac{3\pi}{4}}, \sqrt{0.2}\,e^{j\pi}, \sqrt{0.2}\,e^{-j\frac{\pi}{4}}, \sqrt{0.2}\,e^{-j\frac{\pi}{2}}, \sqrt{0.2}\,e^{-j\frac{3\pi}{4}}, \\ \sqrt{0.8}\,e^{j0\pi}, \sqrt{0.8}\,e^{j\frac{\pi}{4}}, \sqrt{0.8}\,e^{j\frac{\pi}{2}}, \sqrt{0.8}\,e^{j\frac{3\pi}{4}}, \sqrt{0.8}\,e^{j\pi}, \sqrt{0.8}\,e^{-j\frac{\pi}{4}}, \sqrt{0.8}\,e^{-j\frac{\pi}{2}}, \sqrt{0.8}\,e^{-j\frac{3\pi}{4}}, \end{Bmatrix}$$

where $w_1$ is indicative of a weight for use in the reference antenna, and $w_2$ is indicative of weights for use in antennas other than the reference antenna.

7. The method according to claim 4, wherein individual antennas of a changed mode use the same magnitude information if the Mode1 scheme is changed to the Mode2 scheme.

8. A data transmission apparatus for implementing a maximum Transmit Diversity when changing a current Transmit Diversity scheme to another scheme in a mobile communication system including a Node B for transmitting data using a Transmit Diversity scheme and a Mobile Station (MS) for transmitting weights of a plurality of antennas to the Node B to provide the Node B with maximum Transmit Diversity performance, the apparatus comprising:

a mode transition determination unit for determining whether there is a mode transition in the Transmit Diversity scheme upon receiving Transmit Diversity information, wherein the mode transition comprises a transition between a Mode1 scheme and a Mode2 scheme comprised in an open loop transmit diversity scheme or a Mode1 scheme and a Mode2 scheme comprised in a closed loop transmit diversity scheme, or a transition between the open loop transmit diversity scheme and the closed loop transmit diversity scheme;

a weight generator for generating weights associated with individual antennas using a predetermined relationship between weights selected for use according to the determination result of the mode transmission determination unit, and transmitting the generated weights to a signal processor; and the signal processor for transmitting data using the generated weights, wherein the weight generator determines whether the mode transition occurs in the Transmit Diversity scheme, selectively generates a weight in response to the mode transition from among a constellation including a weight of a Transmit Diversity scheme used before the mode transition and a weight of a Transmit Diversity scheme to be used after the mode transition in a same quadrant if it is determined that the mode transition occurs in the Transmit Diversity scheme, and generates a new weight using received weight information if it is determined that no mode transition occurs in the Transmit Diversity scheme.

9. The apparatus according to claim 8, wherein the weight generator selects weights from the constellation if the open loop transmit diversity scheme is changed to the closed loop transmit diversity scheme, and generates the selected weights.

10. The apparatus according to claim 8, wherein the weight generator does not generate weights in the constellation if the closed loop transmit diversity scheme is changed to the open loop transmit diversity scheme.

11. The apparatus according to claim 8, wherein the weight generator stores the closed loop transmit diversity modes each comprise the Mode1 scheme including only phase information and the Mode2 scheme including phase and magnitude information.

12. The apparatus according to claim 11, wherein the weights associated with individual antennas of the Mode1 scheme are denoted by the following equation:

$$w_1 = \frac{1}{\sqrt{2}}, w_2 = \left[\frac{1+j}{2}, \frac{1-j}{2}, \frac{-1+j}{2}, \frac{-1-j}{2}\right]$$

where $w_1$ is indicative of a weight for use in a reference antenna, and $w_2$ is indicative of weights for use in antennas other than the reference antenna.

13. The apparatus according to claim 11, wherein the weights associated with individual antennas of the Mode2 scheme are denoted by the following equation:

$$w_1 = \{\sqrt{0.8}, \sqrt{0.2}\},$$

$$w_2 = \begin{Bmatrix} \sqrt{0.2}\,e^{j0\pi}, \sqrt{0.2}\,e^{j\frac{\pi}{4}}, \sqrt{0.2}\,e^{j\frac{\pi}{2}}, \sqrt{0.2}\,e^{j\frac{3\pi}{4}}, \sqrt{0.2}\,e^{j\pi}, \sqrt{0.2}\,e^{-j\frac{\pi}{4}}, \sqrt{0.2}\,e^{-j\frac{\pi}{2}}, \sqrt{0.2}\,e^{-j\frac{3\pi}{4}}, \\ \sqrt{0.8}\,e^{j0\pi}, \sqrt{0.8}\,e^{j\frac{\pi}{4}}, \sqrt{0.8}\,e^{j\frac{\pi}{2}}, \sqrt{0.8}\,e^{j\frac{3\pi}{4}}, \sqrt{0.8}\,e^{j\pi}, \sqrt{0.8}\,e^{-j\frac{\pi}{4}}, \sqrt{0.8}\,e^{-j\frac{\pi}{2}}, \sqrt{0.8}\,e^{-j\frac{3\pi}{4}}, \end{Bmatrix}$$

where $w_1$ is indicative of a weight for use in the reference antenna, and $w_2$ is indicative of weights for use in antennas other than the reference antenna.

14. The apparatus according to claim 11, wherein individual antennas of a changed mode use the same magnitude information if the Mode1 scheme is changed to the Mode2 scheme.

15. A method for changing a Transmit Diversity scheme to another scheme in a mobile communication system including a Node B for transmitting data using the Transmit Diversity scheme and a Mobile Station (MS) for transmitting weights of a plurality of antennas to the Node B so as to provide the Node B with maximum Transmit Diversity performance, the method comprising the steps of:

receiving, by the MS, transmission signals from the plurality of antennas, and estimating channel state of the Node B;

determining weights of the antennas having the maximum Transmit Diversity using the estimated channel state, including the determined weights in Transmit Diversity information, and transmitting the Transmit Diversity information containing the determined result; and determining, by the Node B, whether a mode transition occurs in the Transmit Diversity scheme on the basis of the Transmit Diversity information, wherein the mode transition comprises a transition between a Mode1 scheme and a Mode2 scheme comprised in an open loop transmit diversity scheme or a Mode1 scheme and a Mode2 scheme comprised in a closed loop transmit diversity scheme, or a transition between the open loop transmit diversity scheme and the closed loop transmit diversity scheme, and generating weights associated with individual antennas by considering a predetermined relationship between weights selected for use depending on the determined mode transition if it is determined that the mode transition occurs in the Transmit Diversity scheme; and transmitting data over the plurality of antennas using the generated weights, wherein the relationship between predetermined Transmit Diversity schemes associates a weight of a Transmit Diversity scheme used before the mode transition with a weight of a Transmit Diversity scheme to be used after the mode transition, such that the weights of the Transmit Diversity schemes are positioned in a same quadrant included in a constellation indicative of weight information.

16. The method according to claim 15, wherein the MS assigns the Transmit Diversity information to a Feedback information (FBI) field, such that the Transmit Diversity information is transmitted to the Node B over an uplink Dedicated Physical Control CHannel (DPCCH).

* * * * *